(12) United States Patent
Mikkonen et al.

(10) Patent No.: US 11,237,033 B2
(45) Date of Patent: Feb. 1, 2022

(54) APPARATUS AND METHOD FOR MEASURING AIR FLOW

(71) Applicant: FläktGroup Sweden AB, Jönköping (SE)

(72) Inventors: Jari Mikkonen, Nokia (FI); Teuvo Sillanpää, Helsinki (FI); Timo Lagerstam, Espoo (FI); Erkki Seppäläinen, Kauniainen (FI)

(73) Assignee: FläktGroup Sweden AB, Jönköping (SE)

( * ) Notice: Subject to any disclaimer, the term of this patent is extended or adjusted under 35 U.S.C. 154(b) by 145 days.

(21) Appl. No.: 16/617,537

(22) PCT Filed: Jun. 27, 2018

(86) PCT No.: PCT/IB2018/054739
§ 371 (c)(1),
(2) Date: Nov. 27, 2019

(87) PCT Pub. No.: WO2019/008473
PCT Pub. Date: Jan. 10, 2019

(65) Prior Publication Data
US 2020/0124449 A1    Apr. 23, 2020

(30) Foreign Application Priority Data
Jul. 7, 2017   (FI) ...................... 20175665

(51) Int. Cl.
*G01F 1/66*   (2006.01)
*G01F 15/02*  (2006.01)
(Continued)

(52) U.S. Cl.
CPC .............. *G01F 1/662* (2013.01); *G01F 1/667* (2013.01); *G01F 1/668* (2013.01); *G01F 15/022* (2013.01);
(Continued)

(58) Field of Classification Search
CPC . G01F 1/66; G01F 1/662; G01F 1/667; G01F 15/022; G01F 25/0007; G01F 1/668; G01N 29/024
See application file for complete search history.

(56) References Cited

U.S. PATENT DOCUMENTS 4,488,428 A    12/1984 Taniuchi
6,390,999 B1 *  5/2002 Zscheile ............. A61M 1/3626
                                                                604/4.01
(Continued)

FOREIGN PATENT DOCUMENTS

DE    102005042792 B3    5/2007
DE    102010035859 A1    3/2011
(Continued)

OTHER PUBLICATIONS

International Search Report and Written Opinion issued by the International Searching Authority in relation to corresponding PCT Application No. PCT/IB2018/054739 dated Oct. 19, 2018, 11 pgs.
(Continued)

*Primary Examiner* — Benjamin R Schmitt
(74) *Attorney, Agent, or Firm* — FisherBroyles, LLP (57) ABSTRACT

An apparatus for measuring air flow in a duct includes a sensor fittable into connection with the duct. The sensor includes an ultrasound transmitter, at least two ultrasound receivers, and a control unit to which the ultrasound transmitter and ultrasound receivers are connectable. The apparatus further includes means for measuring temperature. In a method, with the apparatus, the temperature of the air and/or of a sensor in a duct is measured with means for measuring temperature. A sensor calibration measurement at the temperature in question is performed with the apparatus if a calibration of the sensor at the measured temperature and/or within a certain predefined temperature range has not been performed earlier from the environs of the measured (Continued)

temperature, and temperature compensation data for the measurement result of air flow, the data being formed on the basis of calibration measurement, is determined and/or recorded in memory with the apparatus.

14 Claims, 4 Drawing Sheets

(51) Int. Cl.
 *G01F 25/00* (2006.01)
 *G01N 29/024* (2006.01)

(52) U.S. Cl.
 CPC ....... *G01F 25/0007* (2013.01); *G01N 29/024* (2013.01)

(56) References Cited

U.S. PATENT DOCUMENTS

| | | |
|---|---|---|
| 2003/0136193 A1 | 7/2003 | Fujimoto |
| 2010/0095782 A1 | 4/2010 | Ferencz et al. |
| 2012/0271568 A1 | 10/2012 | Wilson |
| 2013/0317772 A1* | 11/2013 | Dawson .................. G01L 9/065 702/98 |
| 2016/0091354 A9 | 3/2016 | Ramsay |

FOREIGN PATENT DOCUMENTS

| | | |
|---|---|---|
| DE | 102013100670 A1 | 7/2014 |
| EP | 2522963 A1 | 11/2012 |
| WO | 98/00685 A2 | 1/1998 |
| WO | 2010/122117 A1 | 10/2010 |

OTHER PUBLICATIONS

Search report issued by the Finnish Patent Office in relation to corresponding application No. 20175665 dated Jan. 25, 2018, 2 pgs.
Intention to grant (Communication under Rule 71 (3) EPC) received for European application No. 18755541.2 dated Mar. 3, 2021, 29 pages.

* cited by examiner

APPARATUS AND METHOD FOR MEASURING AIR FLOW

CROSS-REFERENCE TO RELATED APPLICATIONS

This application is a National Stage application of International Application No. PCT/IB2018/054739, filed Jun. 27, 2018, which claims benefit to Finnish Application No. 20175665, filed Jul. 7, 2017, which are incorporated by reference herein in their entireties.

BACKGROUND

Field

The invention relates to an apparatus and to a method for measuring air flow e.g. in a duct of a ventilation system.

Description of the Related Art

From the standpoint of the operation of a ventilation system, it is essential that the air flow in the air flow ductwork matches that designed. By examining the directions and velocities of air flows in ventilation ducts, it can be ensured that the system operates in the desired manner. Measuring the directions and velocities of the air flow also enables e.g. various manual or automatic adjustment procedures to be performed in the system.

In prior art, air flow has been measured by the aid of a means installable in, or installed in, a ventilation duct. These types of air flow sensors cause pressure losses in the ventilation duct and also produce noise.

Also known in the art are flow sensors based on ultrasound. Typical of such a prior-art flow sensor is a volume flow rate meter based on measuring the average flow velocity, and its operation is based on measuring the difference in transit time between an ultrasound signal transmitted downstream and upstream. Also disclosed in prior art are so-called hybrid flow meters that operate both on the transit time principle and on the Doppler principle.

Also known in the art are sensors based on the use of ultrasound, in which the flow velocity of the air is determined by means of the transit time difference of the ultrasound signal received at the same moment in time by two ultrasound receivers fitted into connection with the duct.

Ultrasound sensors known in the art measuring airflow velocity can be sensitive to temperature, e.g. owing to manufacturing tolerances or other properties of the sensors. This can be seen e.g. in a situation in which there is no air flow in a duct, i.e. the flow velocity is zero. In such a case, the measurement result for air flow given by the sensor can vary according to the temperature of the sensor and of the environs of the sensor. Furthermore, different sensor units can behave in a different way when the temperature changes. In a case of measuring based on phase difference, different temperatures can cause a phase difference between different receivers, in which case the accuracy of the measurement results changes as the temperature changes. Fully reliable measurement results in different conditions cannot therefore be obtained with the solutions known in the art.

It is also known to rectify the effect of temperature by determining the temperature behavior of each sensor in conjunction with manufacture of the apparatus. A problem with this type of solution is that the measuring and determination work during the manufacturing time in question is time-consuming in the manufacturing phase and thus raises manufacturing costs. In addition to this, the calibration to be performed during the manufacturing phase cannot adapt to the environment of the sensor and changes in that environment.

SUMMARY

The apparatus according to the invention for measuring air flow is based on the use of ultrasound technology and on the measurement of the transit time difference of ultrasound in a duct, e.g. in a ventilation duct, by means of the phase difference of an ultrasound front. By means of the solution of the invention, the precision of measurement based on ultrasound measuring can be improved and reliable operation of the ultrasound sensor in different conditions can be enabled by forming unit-specific temperature compensation coefficients or temperature compensation curves for different sensor units during normal operation.

The method according to the invention is characterized by what is stated in the characterization part of claim 1. The method according to the invention is also characterized by what is stated in claims 2-12. The apparatus according to the invention is characterized by what is stated in the characterization part of claim 13. The apparatus according to the invention is also characterized by what is stated in claims 14-24.

In the solution according to one embodiment of the invention, an ultrasound sensor measuring air flow monitors the air temperature. If the temperature changes to outside the validated range, the sensor autonomously sends a calibration measurement request to the system and/or to an actuator. During calibration measurement, the value of the air flow in a duct in which the air flow is essentially zero is measured and the value is recorded in memory. By means of the calibration measurement values previously recorded and a new calibration measurement value, the apparatus can automatically calculate a compensation curve, i.e. a rectification curve, in relation to temperature. By means of the latest recorded compensation measurement, the validated temperature range of the sensor increases. In this way the sensor can be calibrated at a number of different temperatures and over time the number of calibration measurements to be performed decreases because the calibrated and validated temperature range of the sensor widens with each measurement.

In one embodiment of the invention, the measurement result for the air flow measured by a sensor is compensated by means of calibration based on the determined temperature rectification data.

In one embodiment of the invention, in the method a calibration measurement request and/or calibration measurement notification is sent to the system before performing a calibration measurement.

In one embodiment of the invention, the calibration measurement of a sensor is performed by arranging the flow in the duct to be essentially zero, and by recording after this the velocity of the air flow of the channel measured by the sensor at the temperature in question. In one embodiment of the invention, the apparatus can comprise an adjustment means and/or shut-off means that closes the air duct on the basis of a calibration measurement request and/or calibration measurement notification in such a way that the flow velocity of the air in the duct is essentially zero.

In one embodiment of the invention, the apparatus can perform at least a first calibration measurement when the apparatus or system is started up, initialized, taken into use and/or when the system is serviced. In one embodiment of the invention, the apparatus can perform calibration at predefined intervals of time. If a physical phenomenon causing a temperature rectification changes over the course of time, an automatic and adaptive rectification then adapts to the change over time through new calibration resets.

By means of the solution according to the invention, a sensor-specific temperature compensation coefficient or temperature compensation curve can thus be determined automatically, by means of which coefficient or curve the air flow velocities measured by sensors are reliable at different temperatures. Unit-specific temperature compensation coefficients or temperature compensation curves can be formed for different sensor units during normal operation. By means of the solution according to the invention, it is not necessary therefore to perform time-consuming determination of sensor-specific temperature compensation coefficients in conjunction with commissioning or manufacture. When compensation data is collected at the final installation site of the sensor, the compensation data is also as accurate as possible because it is measured in the final operating environment of the sensor. Calibration measurements performed at the final installation site also take into account the operation of other components and the measurement inaccuracies caused by them at different temperatures.

BRIEF DESCRIPTION OF THE FIGURES

In the following, the invention will be described in more detail by the aid some embodiments with reference to the drawings 1-4, wherein.

DETAILED DESCRIPTION

Figure 1:
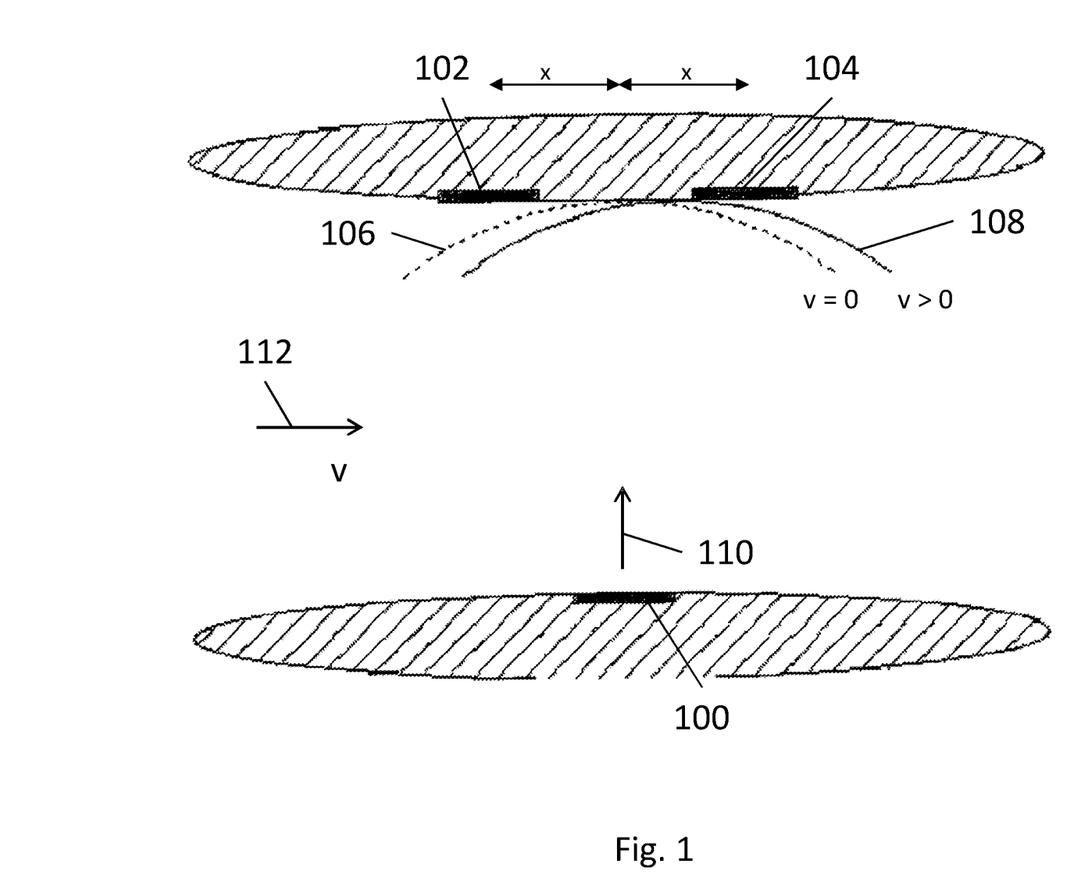
FIG. 1 presents the operating principle of an embodiment, according to the invention, of a flow sensor based on measuring a phase difference.

FIG. 1 presents the operating principle of an air flow sensor according to an embodiment of the invention. The apparatus presented in FIG. 1 comprises at least one ultrasound transmitter 100 and at least two ultrasound receivers 102, 104. During operation of the apparatus, the ultrasound transmitter 100 transmits ultrasound and the receivers receive the ultrasound transmitted by the ultrasound transmitter. After this, the ultrasound emissions received at the same moment in time are compared to each other and their phase difference is determined.

FIG. 1 also presents the wavefronts 106, 108 of the ultrasound emission 110. If the velocity v of the air flow 112 in the space between the transmitter and the receivers is zero, the wavefront 106 propagates directly from the transmitter towards the receivers, at a right angle to the ventilation duct. If, in this situation, both the receivers 102, 104 are at an equal distance x from the transmitter 100, the ultrasound transmissions received by the receivers 102, 104 do not have a transit time difference. By means of this, the apparatus can determine that the flow velocity v of the air in the space between the ultrasound transmitter 100 and the receivers 102, 104 is zero.

If there is an air flow in the space between the ultrasound transmitter 100 and the ultrasound receivers 102, 104, i.e. the velocity v of the air flow 112 is greater than zero, the wavefront 108 shifts in the direction of the flow. In this case, a change in the transit time difference is detected with the apparatus by comparing the ultrasound emission received at the same moment in time by the receivers 102, 104, and by means of this the direction and velocity v of the air flow in the space between the ultrasound transmitter 100 and the receivers 102, 104 can be determined.

Figure 2:
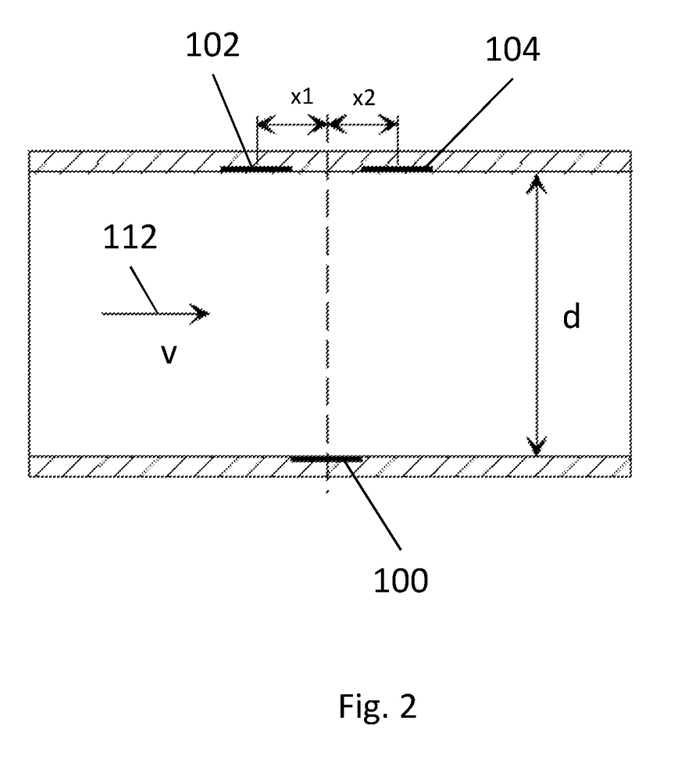
FIG. 2 presents the structure of an embodiment, according to the invention, of a flow sensor based on measuring a phase difference.

FIG. 2 presents the structure of an air flow sensor according to an embodiment of the invention. The apparatus presented in FIG. 2 comprises a transmitter 100, installed at a right angle to the flow direction, and two or more receivers 102, 104. If the direction 112 of the flow is from left to right, the wavefront arrives at the sensor 104 on the right faster than at the sensor 102 on the left, i.e. the arriving wavefront has a transit time difference and therefore also a phase difference. The phase difference is directly proportional to the average flow velocity v, to the distance (x1+x2) of the receivers 102, 104 and to the frequency of the ultrasound, but inversely proportional to the speed of sound. A phase shift of 180 degrees can, for example, correspond to an air flow velocity of 30 m/s. In an ideal case, the distances x1 and x2 are of equal lengths, but the distance difference between the distances x1 and x2 can be determined and compensated e.g. by measuring a static phase difference in a situation in which the air flow velocity is zero. In practice, in an installation situation the values x1 and x2 easily deviate from each other although the objective is symmetry.

In one embodiment of the invention, the distances x1 and x2 can be of different magnitudes, in which case when the air is stationary a static phase difference is detected. When the flow velocity of the air increases in the direction of the side on which the distance to the transmitter is greater, the phase difference decreases and receives the value zero, as the flow velocity of the air shifts the wavefront by exactly the amount of the distance difference x1−x2 of the receivers. The distance difference can be rectified by resetting the static phase difference caused by the distance difference. The distance difference increases temperature dependency, which can be compensated with the method according to the invention if the distance difference is small compared to the distance between the sensors.

In one embodiment of the invention, the distance of the receivers 102, 104 from each other (x1+x2) is 20 mm-80 mm. By using the aforementioned distance, optimally precise measurement of the flow velocity can be ensured by means of the apparatus according to the invention.

In the measuring method ultrasound can be generated either continuously or in pulses, depending on the geometry of the pipe. In pulsed running, the phase difference is measured inside the tone burst arriving at the receivers 102, 104. By using pulsed running, the measuring errors caused by reflections of the sound can be eliminated. It is advantageous to read the phase from an even area of the pulse. A second boundary condition can be obtained from the shortest distance of the receivers and the transmitters, from the transit time of the pulse coming via reflections, and from the directional gain of the transmitter. For example, if 60 kHz ultrasound and a transmitter possessing a 10 mm diameter are used, then a suitable pulse length for a round pipe is roughly the diameter d of the pipe divided by the speed of sound. Since the measurement is based on measuring phases, the measurement is independent of amplitude. The strength of the pulse to be transmitted is selected in such a way that a good signal is obtained in the receivers using ordinary preamplification, and the signal-noise ratio is sufficiently high for the needs of further processing.

In both measuring methods, broadband sensors can be advantageously used. With broadband sensors, the phase response is more even than in narrow band sensors based on resonance. In narrow band sensors, the error caused by differences in resonance frequencies and by variations in Q-values is larger. Also rise times are shorter with broadband sensors, which is important if pulsed running is used. On the transmitter side a low Q-value means a faster pulse response. The transmitter should be sufficiently directional, but, however, in such a way that the beam reaches the receivers at all flow velocities. The width of the transmitter beam can be e.g. 200-400, preferably e.g. approx. 300.

Figure 3:
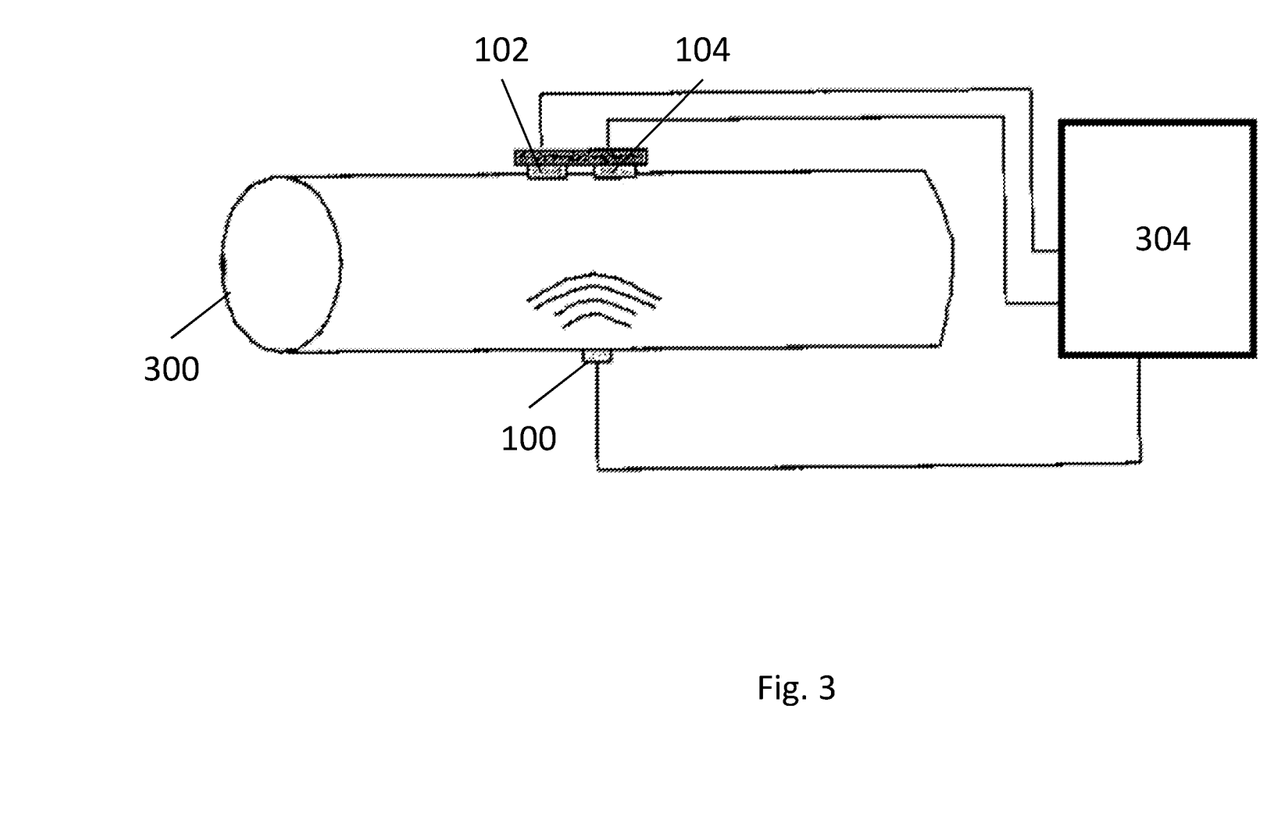
FIG. 3 presents a schematic view of an embodiment, according to the invention, of a flow sensor based on measuring a phase difference.

FIG. 3 presents an apparatus according to one embodiment of the invention for measuring air flow. The apparatus comprises one ultrasound transmitter 100 and two receivers 102, 104, which are disposed on opposite sides of a ventilation duct 300. The ultrasound transmitter 100 and the ultrasound receivers 102, 104 are connected to a control unit 304, which comprises measuring electronics, e.g. means for measuring the transit time difference of the signals received by the receivers 102, 104 based on the phase difference. From the phase difference of the signals received by the receivers, the control unit 304 can determine the direction and velocity of the air flow in the ventilation duct. The control unit 304 can also control the ultrasound signal transmitted by the ultrasound transmitter. The control unit 304 can be integrated into the transmitter and/or the receivers or it can be a separate unit. If the control unit 304 is a separate unit, the ultrasound transmitter 100 and ultrasound receivers 102, 104 can be connected to the control unit 304 with a wireline or wirelessly. The control unit 304 can also comprise a display device, with which the measurement results can be presented. The control unit 304 can also transmit the measurement results to an external device, e.g. to an air flow controller, to a data processing device or to a display device.

Figure 4:
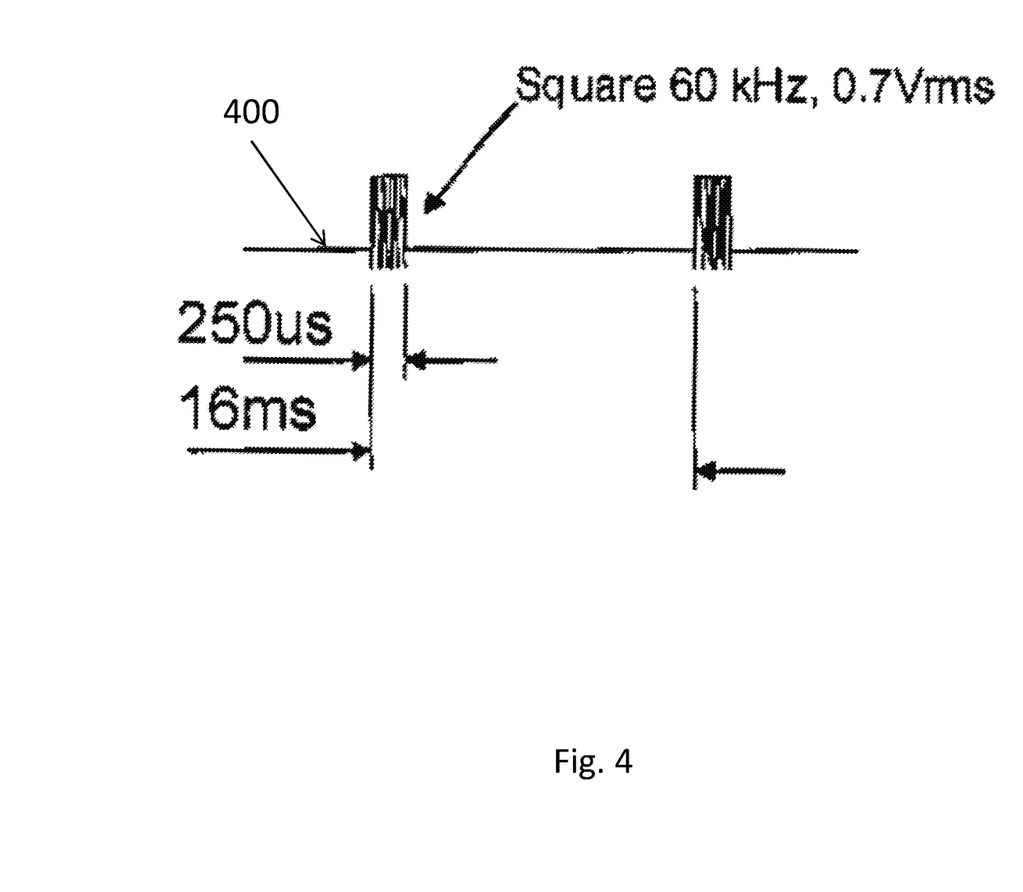
FIG. 4 presents an example of an ultrasound transmitter according to an embodiment of the invention.

In one embodiment of the invention, microphones, such as MEMS microphones, can be used as the ultrasound receivers. The frequency of the ultrasound transmitter can be e.g. 60 kHz, the operating cycle 60 Hz and the length of one pulse 250 microseconds. An example of the signal format 400 transmitted by the ultrasound transmitter of the embodiment is presented in FIG. 4. Other frequency ratios and pulse ratios also can be used in the solution of the invention and the signal format presented above and in FIG. 4 is only an example.

In the solution according to the invention, the apparatus comprises a sensor fittable into connection with the duct, the sensor comprising an ultrasound transmitter and at least two ultrasound receivers, and a control unit to which the ultrasound transmitter and ultrasound receivers are connectable. The apparatus further comprises means for measuring temperature. In the solution according to the invention, the apparatus measures the temperature of the air and/or of a sensor in a duct with means for measuring temperature. Based on this, the apparatus performs a calibration measurement of the sensor at the temperature in question if a calibration measurement of the sensor at the measured temperature and/or within a certain predefined temperature range has not been performed earlier from the environs of the measured temperature. After this, the apparatus determines and/or records in memory, e.g. in the memory of a control unit, temperature compensation data for the measurement result of air flow, the data being formed on the basis of the calibration measurement.

The solution according to the invention can e.g. function as follows. Means for measuring temperature that are in connection with a sensor or with the apparatus measure the temperature, e.g. continuously or at certain intervals of time. When the apparatus detects a temperature at which a measurement has not yet been performed or a temperature range within which a measurement has not yet been performed, the sensor sends a request to perform a calibration measurement. This can be performed e.g. when the apparatus is started up for the first time. During the calibration measurement, the air flow of the air duct can be arranged to be essentially zero, e.g. by means of an adjustment means or shut-off means in the duct. After this, a measurement of the air flow velocity is performed and the results of the measuring are recorded in memory. When the measuring is performed in such a way that the air flow velocity is zero, the phase difference measured by the receivers of the sensor is an error caused by temperature. A certain predefined temperature range is set in the system, and a calibration performed within which range is valid. In one embodiment, the calibration measurement performed is valid within a range of ±2° C. from the measured temperature.

If the temperature of the air changes to outside the calibrated range, i.e. to outside a measured temperature range by a certain predefined amount, e.g. by over two degrees from a measured temperature, a new calibration measurement is performed with the apparatus at the new temperature and it is recorded in memory. On the basis of the first calibration measurement and the new calibration measurements it is possible to form a temperature compensation function, i.e. a temperature rectification function, which compensates, i.e. rectifies, the phase difference error caused by temperature, e.g. in such a way that when the air flow is zero, the velocity of the air flow measured by a sensor is also essentially zero or as close as possible to zero. By means of a number of compensation measurements performed at different temperatures, the rectification function between the temperatures in question can be determined. After performing the measurement, the validated temperature range increases in one predefined range, i.e. in the case of the embodiment by two degrees. If the detected temperature of the air flow changes to outside the validated temperature range, the apparatus performs a calibration measurement again in accordance with what is described above, and again the validated temperature range can be increased by a set amount. By means of the new measurement results, a compensation curve can be redefined or it can be made more precise, in which case the measurement accuracy of the sensor in different conditions improves with each measurement.

In the manner presented above, after startup of the sensor, the sensor and/or apparatus sends calibration measurement requests relatively often but during operation the number of calibration measurement requests decreases because the validated temperature range increases with each calibration measurement. In the manner presented above, the sensor and the sensor system can compensate a sensor measuring error at different temperatures, sensor-specifically and automatically, in conjunction with normal operation and at the actual installation site of the sensor. In this way the measurement accuracy of a sensor can be improved and the sensor does not need to be precalibrated, e.g. in its manufacturing phase.

The apparatus can be arranged to reset the calibration results and calibration data at certain time intervals and after this to restart calibration. In this way, an automatic and adaptive rectification adapts to changes in conditions through new calibration resets over time, if e.g. a physical phenomenon causing a temperature rectification changes over the course of time. By means of the aforementioned embodiment, an offset error, and/or a change in it, resulting from dust accumulation or from some other ageing can also be compensated.

When the calibration measurement has been performed, or a rectification coefficient or rectification curve based on it has been determined, the results can be recorded e.g. in a controller unit or controller device. In one embodiment of the invention, at least a first calibration can be performed always when the apparatus or system is started up, initialized, taken into use and/or when the system is serviced. In one embodiment of the invention, calibration can also be performed at predefined even intervals, so that the measuring functions optimally throughout the service life of the apparatus and a change associated with ageing or wear of the apparatus, or e.g. factors associated with the duct becoming dirty, can be compensated.

In one embodiment of the invention, the ultrasound receivers do not need to be on the opposite side of the ventilation duct with respect to the ultrasound transmitter, but instead it is also possible that the ultrasound transmitter and one or more ultrasound receivers are on the same side of the ventilation duct. If the ultrasound transmitter and an ultrasound receiver or ultrasound receivers are on the same side of the ventilation duct, a ventilation duct surface is needed on the opposite side to the sensors, the surface reflecting the ultrasounds sent by the ultrasound transmitter to the ultrasound receiver or ultrasound receivers. It is advantageous to shape or to treat the surface of the pipe in such a way that sound reflects efficiently back to the receivers.

In one embodiment of the invention, an individual ultrasound sensor can be used both as an ultrasound receiver and as an ultrasound transmitter.

The device according to the invention for measuring air flow can be rigidly installed into connection with a ventilation duct. In one embodiment of the invention, the ultrasound transmitter sensor and the ultrasound receiver sensors are rigidly installed into connection with a ventilation duct, e.g. on the inside surface of the ventilation ductwork. In another embodiment of the invention, the ultrasound transmitter sensor and the ultrasound receiver sensors are rigidly integrated as a part of the pipe in such a way that at least a part of the structure of the sensors is outside the pipe and an aperture corresponding to the transmitter and/or receiver of the sensor is made in the pipe, by means of which aperture the sensor can transmit or receive ultrasound signals that are inside the ventilation duct. The control unit of the apparatus according to the invention can also be integrated into connection with a sensor or sensors, or the apparatus can comprise only connectors with which a separate control unit can be connected to the sensors. An advantage of sensors rigidly installed into parts of ventilation ductwork, e.g. in pipes, is that the parts of the ventilation duct are easily installable into their position, and when installing them there is no need to perform separate adjustment or installation procedures on the air flow sensors.

With the apparatus according to the invention, continuous measurement of the air flow can be performed, or the measuring of air flow can be regulated to occur at certain predefined and/or selectable intervals of time.

The apparatus according to the invention for measuring air flow can be used for measuring the air flow in different parts of a ventilation system, such as e.g. in ducts, regulating boxes, fans, flow controllers, Iris dampers and measurement heads.

One embodiment of the invention thus relates to a solution wherein the apparatus comprises a sensor fittable into connection with the duct, the sensor comprising an ultrasound transmitter 100 and at least two ultrasound receivers 102, 104, and a control unit 304 to which the ultrasound transmitter and ultrasound receivers are connectable. The apparatus further comprises means for measuring temperature, and in which method temperature compensation data is determined automatically at the installation site of the apparatus in conjunction with normal operation as follows:

in the method, with the apparatus the temperature of the air and/or of a sensor in a duct is measured with means for measuring temperature, a sensor calibration measurement at the temperature in question is performed with the apparatus if a calibration of the sensor at the measured temperature and/or within a certain predefined temperature range has not been performed earlier from the environs of the measured temperature, and temperature compensation data for the measurement result of air flow, the data being formed on the basis of calibration measurement, is determined and/or recorded in memory with the apparatus, e.g. in the memory of a control unit.

In one embodiment of the invention, the apparatus calibrates itself automatically, autonomously and/or independently at its installation site, e.g. at the normal and/or final installation site. The apparatus can perform calibration in conjunction with normal operation according to need, e.g. when the temperature changes to be one for which there is not yet any calibration data and/or for which the previous calibration data is older than the maximum age for calibration data set in the apparatus.

It is obvious to the person skilled in the art that the different embodiments of the invention are not limited solely to the examples described above, and that they may therefore be varied within the scope of the claims presented below. The characteristic features possibly presented in the description in conjunction with other characteristic features can also, if necessary, be used separately to each other.

What is claimed is:

1. A method for measuring air flow in a ventilation duct, with an apparatus, wherein the apparatus comprises a sensor fittable into connection with the duct, the sensor comprising an ultrasound transmitter and at least two ultrasound receivers, and a control unit to which the ultrasound transmitter and ultrasound receivers are connectable, wherein the apparatus further comprises a temperature sensor for measuring temperature, and in which method temperature compensation data is determined automatically at the installation site of the apparatus in conjunction with normal operation as follows:

with the apparatus, the temperature of the air and/or of a sensor in a duct is measured with the temperature sensor, a sensor calibration measurement at a temperature in question is performed with the apparatus by arranging the flow in the duct to be essentially zero if a calibration of the sensor at the measured temperature and/or within a certain predefined temperature range has not been performed earlier from the environs of the measured temperature, and temperature compensation data for the measurement result of air flow, the temperature compensation data being formed on the basis of the measured velocity of the sensor calibration measurement, is determined and/or recorded in memory with the apparatus.

2. The method according to claim 1, wherein a temperature rectification coefficient for a sensor is determined based on the sensor calibration measurement for the measured temperature.

3. The method according to claim 1, wherein a temperature rectification curve for the sensor is determined on the basis of the calibration data measured at different temperatures.

4. An apparatus for measuring air flow in a duct, e.g. in a ventilation duct, wherein
the apparatus comprises a sensor fittable into connection with the duct, the sensor comprising an ultrasound transmitter and at least two ultrasound receivers, and a control unit to which the ultrasound transmitter and ultrasound receivers are connectable,
wherein the apparatus further comprises a temperature sensor for measuring temperature, and wherein the apparatus is adapted to determine the temperature compensation data automatically at the installation site of the apparatus in conjunction with normal operation as follows:
the apparatus is adapted to measure the temperature of the air and/or of the sensor in a duct with the temperature sensor,
the apparatus is adapted to perform a sensor calibration measurement at a temperature in question by arranging the flow in the duct to be essentially zero if the sensor calibration measurement at the measured temperature and/or within a certain predefined temperature range has not been performed earlier from the environs of the measured temperature, and
the apparatus is adapted to determine and/or to record in memory, temperature compensation data for the measurement result of air flow for the temperature in question based on the velocity of the air flow measured, the temperature compensation data being formed on the basis of the sensor calibration measurement.

5. The apparatus according to claim 4, wherein the apparatus is adapted to determine a temperature rectification coefficient for the sensor based on the sensor calibration measurement for the measured temperature.

6. The apparatus according to claim 4, wherein the apparatus is adapted to determine a temperature rectification curve for the sensor on the basis of the sensor calibration data measured at different temperatures.

7. The apparatus according to claim 4, wherein the apparatus is adapted to compensate the measurement result for the air flow measured by the sensor, based on the temperature rectification data determined by the calibration measurement.

8. The apparatus according to claim 4, wherein the apparatus is adapted to send a calibration measurement request and/or calibration measurement notification to the system before performing a calibration measurement.

9. The apparatus according to claim 4, wherein the apparatus comprises an adjustment device and/or shut-off device that is adapted to close the air duct on the basis of a calibration measurement request and/or calibration measurement notification in such a way that the flow velocity of the air in the duct is essentially zero.

10. The apparatus according to claim 4, wherein the apparatus is adapted to perform a calibration measurement of the sensor again if the temperature changes to be such that a calibration measurement of the sensor at the measured temperature and/or within a certain predefined temperature range has not yet been performed from the environs of the measured temperature.

11. The apparatus according to claim 4, wherein the apparatus is adapted to reset and/or delete calibration measurement results and/or temperature compensation data formed on the basis of calibration measurements at certain time intervals, and after this the apparatus is adapted to start performing calibration again.

12. The apparatus according to claim 4, wherein the apparatus is adapted to send to and/or record in a controller unit or a controller device the temperature compensation data determined by the sensor calibration measurement.

13. The apparatus according to claim 4, wherein the ultrasound receivers are arranged in connection with the duct in such a way that the distance from both ultrasound receivers to the ultrasound transmitter is of essentially the same magnitude.

14. The apparatus according to claim 4, wherein the ultrasound receivers are arranged in connection with the duct in such a way that the distances between the ultrasound receivers and the ultrasound transmitter are of different magnitudes.

* * * * *